United States Patent Office 3,448,550
Patented June 10, 1969

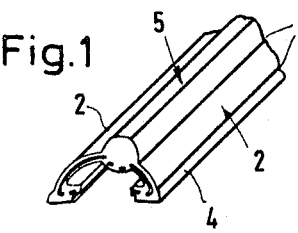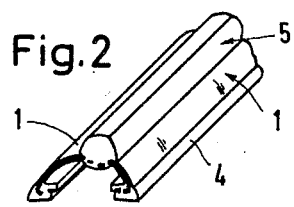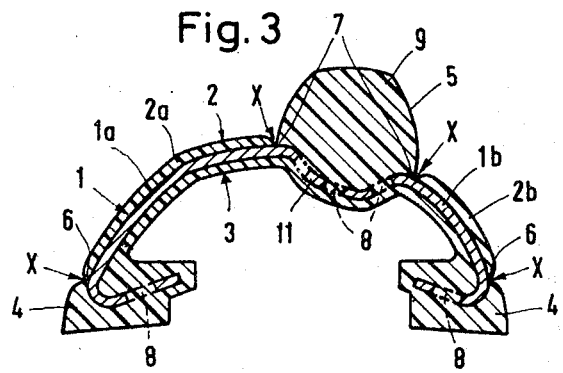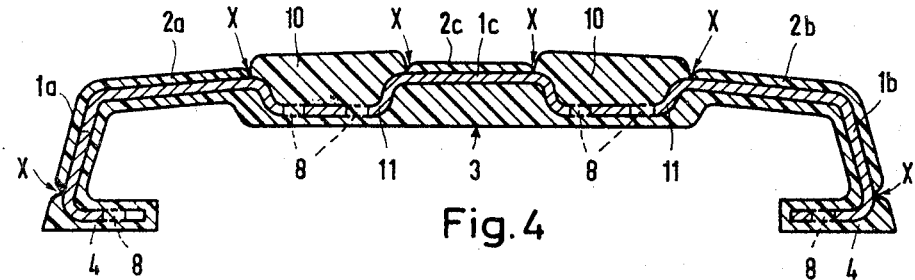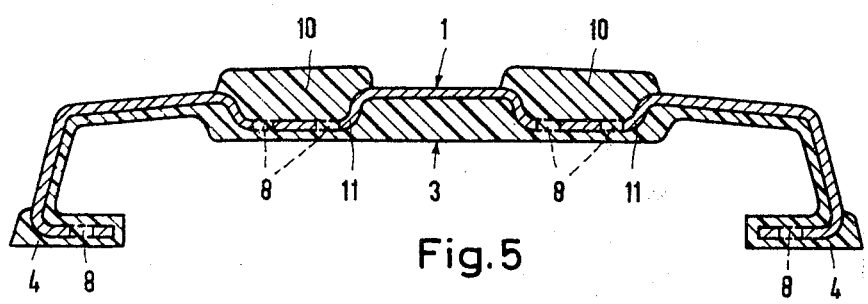

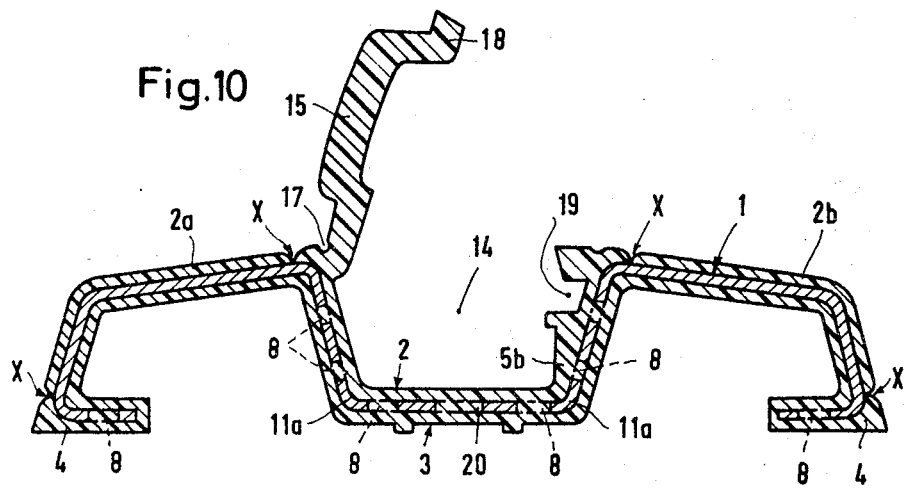
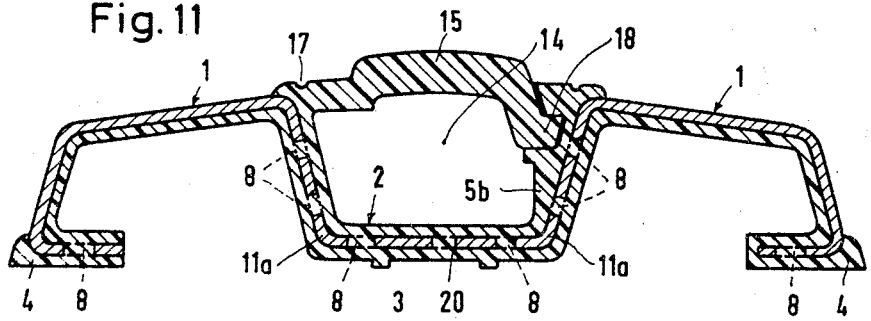
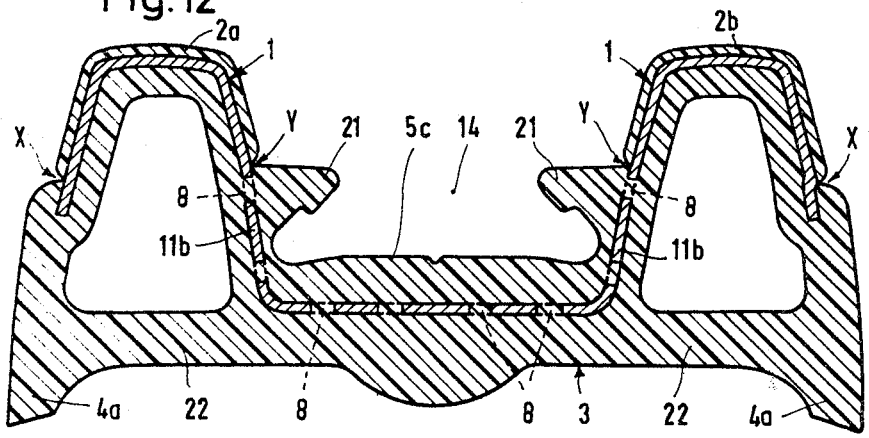

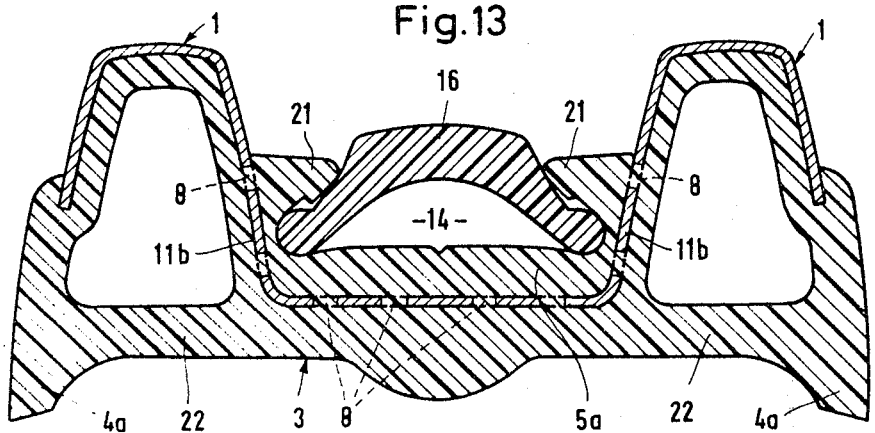
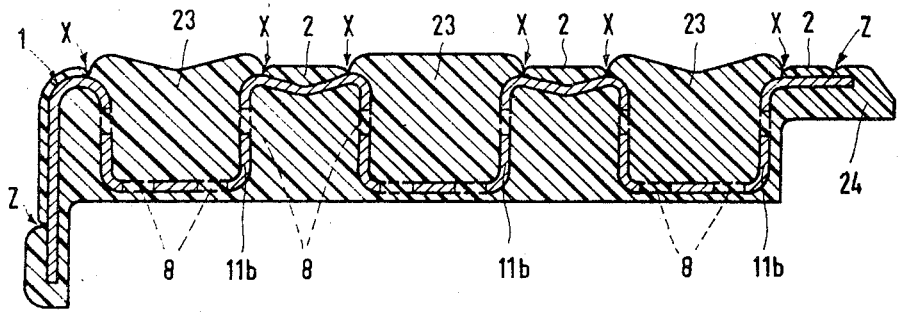
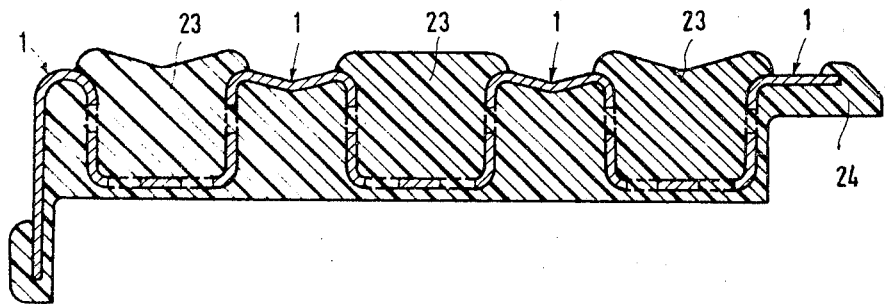

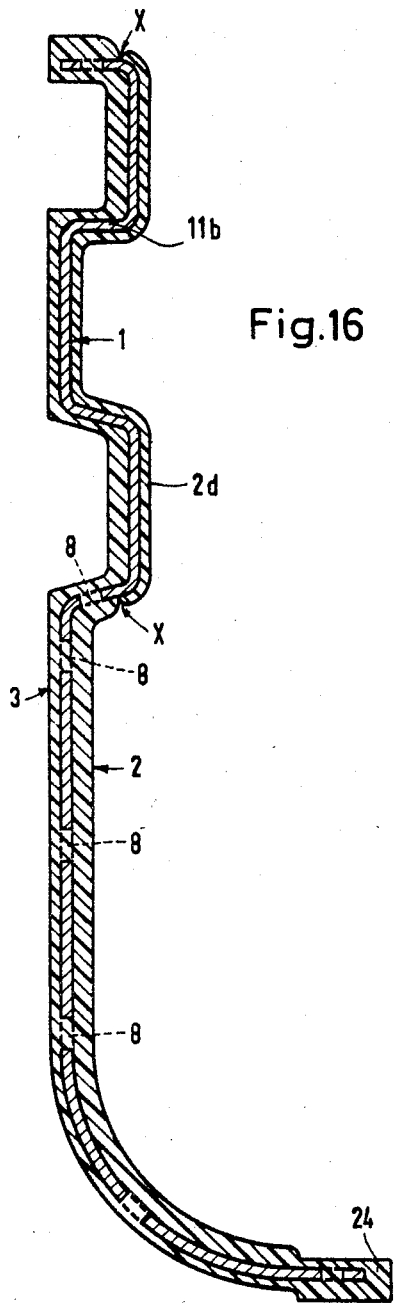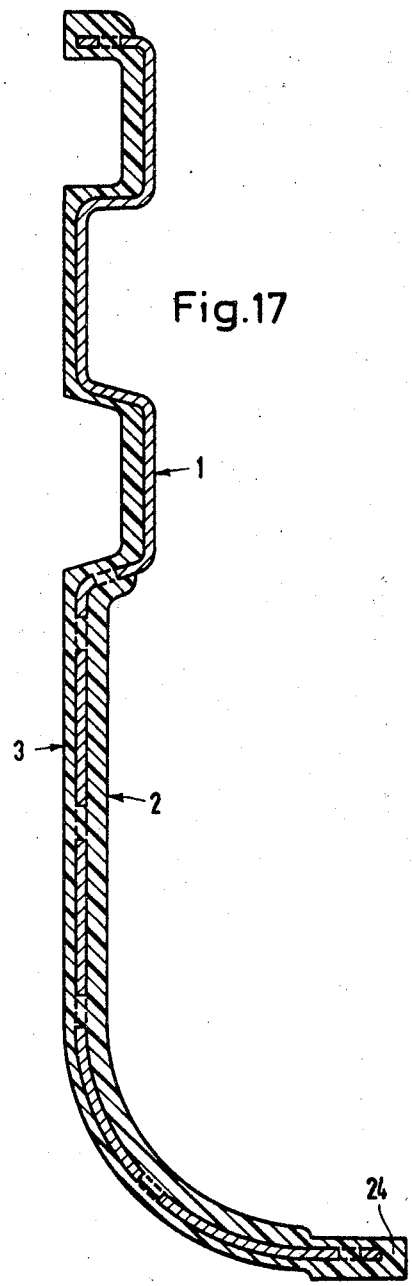

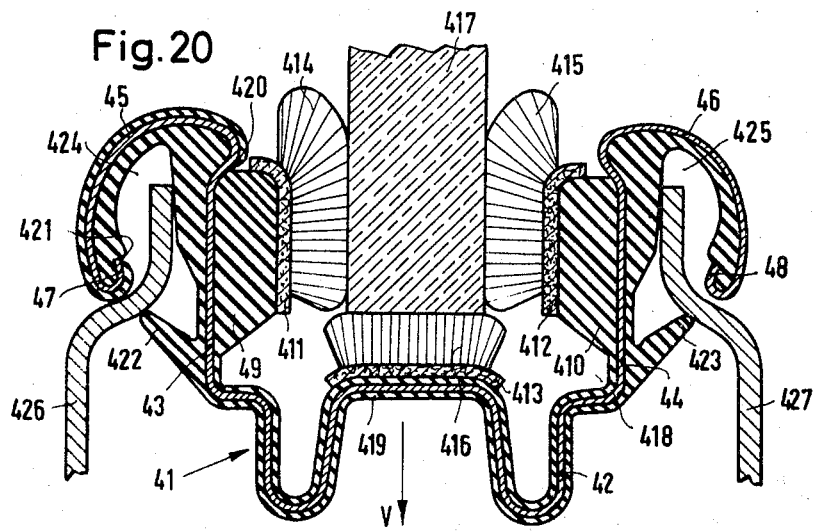
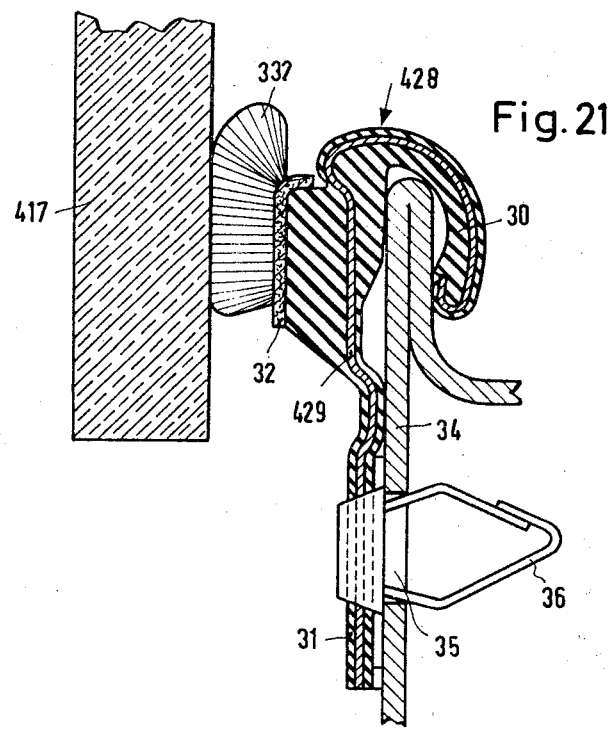

3,448,550
COVER MOLDING, PARTICULARLY FOR MOTOR VEHICLE BODIES
Gerhard Herr, Hochdahler Weg 29, Wuppertal-Vohwinkel, Germany, and Willi O. Treber, Oberstrasse 18, Wuppertal-Elberfeld, Germany
Filed Mar. 6, 1967, Ser. No. 620,782
Int. Cl. B32b 7/06, 1/04; E04c 2/30
U.S. Cl. 52—98                                                9 Claims

ABSTRACT OF THE DISCLOSURE

This disclosure relates to a cover molding, particularly for motor vehicle bodies. The molding comprises a relatively hard carrier and a relatively soft, yieldable covering on said carrier. The covering is formed with indentations, which extend in the longitudinal direction of the molding and define a removable portion of the covering so that the removal of this portion exposes the underlying surface of the carrier.

---

The invention relates to a cover molding, which is used in motor vehicle bodies and serves for protecting, sealing, guiding and/or decorative purposes.

The known moldings of this kind comprise a carrier, which consists in most cases of pressed or drawn metal and which is more or less cambered and has limbs under which a sealing strip is laid when the carrier is being mounted. The carrier has on its front side one or more longitudinal grooves, in which a roll or filler of resilient material can be placed. The exposed surfaces of these moldings are usually polished. The moldings are secured with the aid of screws or bolts. The underlying sealing strip and a filler for sealing the fastening means are applied at the same time. The assembling of such moldings requires considerable care and is time-consuming if damage to the polished surfaces of the moldings is to be avoided. For the same reason, a careful packaging of the molding is required to protect the same in transit.

To avoid these difficulties and to afford a substantial saving in cost, the invention is based on the concept to provide a protective covering for the molding on the polished surfaces thereof simultaneously with the application of the underlying sealing strips and, if desired, of rolls or fillers, which operation is carried out by machine. This protective covering can be removed from the mounted carrier so that the polished surfaces become exposed. Within the scope of the invention, the carrier which is used in forming the molding is covered with plastics material by an extruder.

To solve the object indicated above, a molding which consists of a plastic-covered carrier is provided according to the invention in the outer portion of the plastics material covering with longitudinal indentations, which define the removable layer of plastics material.

As a result, the protective covering on the polished surfaces can be pulled off by hand when the protection is no longer required. This can be effected without difficulty and particularly without need for a tool. The remaining covering is defined by smooth and straight edges. This design does not involve additional costs in the manufacture and is unique in that it enables the manufacture of decorative moldings by extrusion in a single operation.

In order to ensure a reliable adherence of the covering in those areas of the molding in which the covering might detach from the carrier strip, it is a feature of the invention to perforate the carrier in those areas where the plastics material is not to be removed so that the plastics material is anchored in the perforations.

The invention may be applied to various forms of moldings.

In a so-called skirting strip, it is suitable to apply the layer of plastics material which is to be removed to both limbs beside a buffer, which is formed by the plastics material covering, and to define the layer which is to be stripped off by parting lines.

In a decorative molding which is to be secured at its rear, the removable layers of plastics material are provided between an anchored, enlarged portion of the covering, which is defined by an inwardly curved portion of the carrier, and the toes of the carrier, which are entirely covered.

In this case, decorative strips which differ in color may be heat-sealed to the anchored, enlarged portion of the covering.

Within the scope of the invention, the anchored, enlarged portion of the covering enables the provision of the latter with a longitudinally extending, undercut recess for receiving a filler.

Particularly with decorative moldings which are to be secured with screws from the outside, such as are used, e.g., for busses, it will be advantageous to provide a strip which is integrally extruded with the covering to merge into the same on one side and adapted to be snapped into position on the carrier on the other side so that it covers that inwardly curved portion of the carrier which receives the head of the fastening screw. The removable portions of the covering are then disposed between such strip and the toes.

Alternatively, a separately manufactured filler strip may be used if the same is snapped in on both sides under ribs of the enlarged portion of the covering.

If a molding which embodies the invention is to be provided with particularly soft toes, which seal against a surface contacting them, the removal of the covering will be facilitated if the toes are formed only by the covering and do not contain a portion of the carrier, and the covering comprises a web which extends from the central portion to the edge so that any forces which tend to detach the covering remain harmless when the covering portions are being removed.

In the case of a footboard molding, the design according to the invention is obtained in that the carrier is provided with a plurality of parallel, inwardly curved portions, which are filled with the covering material and adjoined by the removable portions of the covering.

In this case, that portion of the covering which is not to be removed may be designed to form an edge portion which can be heat-sealed, e.g., to a floor covering.

The invention enables also the design of a so-called base molding, which has inwardly curved portions in its upper part and in which the removable covering portion covers these inwardly curved portions. An edge portion for heat-sealing is provided at the lower end of the covered molding.

In an I-shaped molding for use as a window crossbar, the invention may also be embodied in that the outside of one flange of the molding carries the removable covering portion. The other flange may then be provided with a hollow pad for absorbing shocks, if desired.

The invention is also applicable to moldings which are used for sealing and guiding slidable windowpanes, preferably in vehicles. This molding consists of a carrier strip and its covering, e.g., of rubber or plastics material, and at least one edge strip. In this case the application of the invention results in a simple design of such moldings so that the same can be clamp- or snap-fitted on a carrying flange or another protruding structural part of a body and can be manufactured easily and at low cost.

In this molding, the carrier strip and the edge strip are integral in accordance with the invention. This results in a considerable saving of material because the edge strip need not overlap the carrier strip in certain portions, as is inevitable when these two elements are joined in the usual manner. Besides, the manufacturing time is reduced because the separate manufacturing and processing of the carrier strip and edge strip, as well as the assembling of the edge strip on the carrier strip, are eliminated. Finally, the abovementioned integral strip according to the invention eliminates the disadvantage which is inherent in two-part strips and resides in that the edge strip may detach from the carrier strip when the same is being bent.

According to another feature of the invention, the integral strip consisting of a carrier strip portion and an edge strip portion is reversely bent away from the window plane at that edge of the strip which faces the middle of the window. In a special embodiment, the strip is substantialy U-shaped in cross-section and both free end portions of the limbs are reversely bent away from the window plane. The reverse bending of the strip results in a simple manner in the formtaion of a channel, which enables a clamping of the strip to a fixing flange. This will avoid the formation of a sharp edge, which might cause injury, particularly if the edge of the strip is not covered by yieldable material.

According to another advantageous feature of this embodiment of the invention, the free end of the reversely bent edge portion is inturned to reinforce the reversely bent edge portion in the area where it meets the mounting flange.

In another preferred embodiment of the invention, the free end of the reversely bent edge portion cooperates with a projection on the outside of the molding so as to secure the latter to the vehicle. In this case it will be particularly desirable if, in accordance with the invention, the projection is integral with the covering. Simultaneously with the application of the covering onto the carrier strip of the molding, the projection will then be integrally formed with the covering without requiring additional time and labor. The projection facilitates the fitting of the molding to a mounting flange because the yieldable projection gives way in a lateral direction. On the other hand, the design of the projection like a barb facilitates a spontaneous slipping of the mounted molding from the mounting flange.

In another advantageous embodiment of the invention, the covering has adjacent to the reversely bent edge portion at least one tear line, which extends in the longitudinal direction of the molding. This enables a tearing of the covering from the carrier strip at predetermined portions. A partial exposure of the carrier strip will mainly be desirable when the mechanical stresses are so high that they cannot be taken up by the covering of soft, yieldable material, whereas the carrying strip consisting of harder material will withstand such stresses. For instance, in a molding which is U-shaped in cross-section the edge of one limb may remain covered whereas the covering is removed from the edge of the other limb. E.g., in a window-guiding bar in a motor vehicle the covering will be removed from the outer limb at its edge which is exposed to the weather whereas the edge of the limb which faces the interior of the vehicle will remain covered. This affords the advantage that a color which matches the interior decoration of the vehicle may be selected for the covering. If the carrying strip consists of metal or has a bright metal coating, the exposed portion of the outwardly facing limb will have also a decorative effect. As the partial removal of the covering from the strip will not be effected until the molding has been installed, there is also the advantage that the surface of the carrying strip will not be subjected to mechanical damage during the shaping and mounting thereof.

In a preferred embodiment of the invention, a tear line is provided at the beginning and end of the reversely bent edge portion. In this case the covering can be removed in such a manner that the molding is covered on the outside by the edge portion of the stable edge strip in the very area which is liable to be subjected to mechanical stresses from the outside.

A desirable feature of the invention resides also in that the integral strip comprising carrying strip and edge portions consists of corrosion-resisting material, preferably stainless steel. A suitable corrosion-resisting material is, e.g., a plastics material which is harder than the covering. Such materials have the advantage that they possess a decorative appearance without need for a surface finishing treatment when the covering has been removed.

Various moldings embodying the invention are shown by way of example in the drawings.

FIG. 1 is a perspective view, approximately in full scale, and shows a portion of a skirting strip, in which the carrier has a covering of plastics material and carries a buffer. According to the invention, the limbs of the carrier are provided with a removable covering portion, which is defined on both sides by indentations.

FIG. 2 is a view similar to FIG. 1 and shows the mounted skirting strip, from which portions of the covering have been removed to expose polished metal surfaces of the carrier.

FIG. 3 is an enlarged view showing this skirting strip according to the invention in cross-section.

FIG. 4 is a view which is enlarged like that of FIG. 3 and shows in cross-section a completely covered decorative molding to be secured from the rear.

FIG. 5 shows the molding of FIG. 4 after the covering has been removed from the limb surfaces of the carrier.

Figure 6:
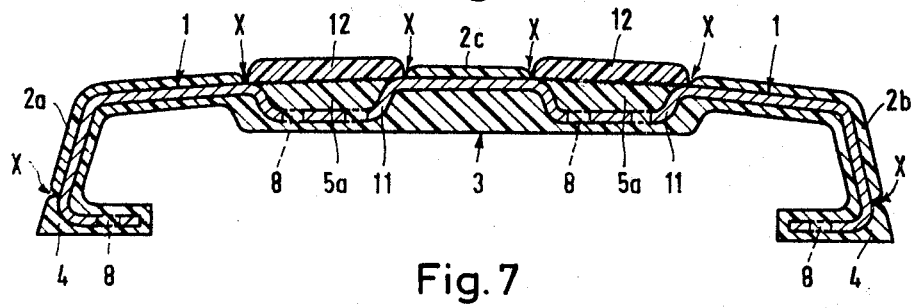
Figure 7:
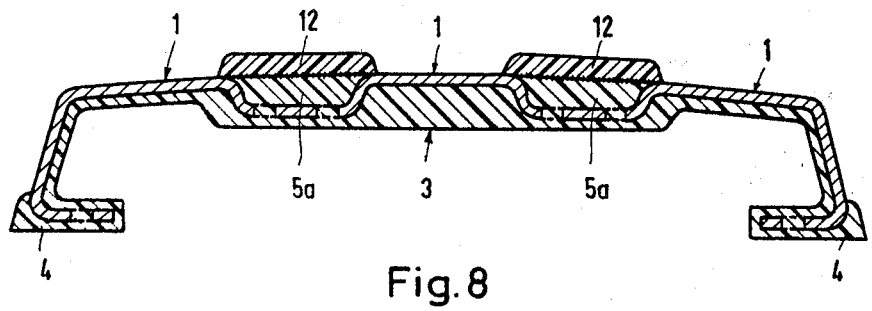

FIGS. 6 and 7, respectively, show another embodiment of the decorative molding with a complete covering and after the removal of the covering from surface portions of the carrier.

Figure 8:
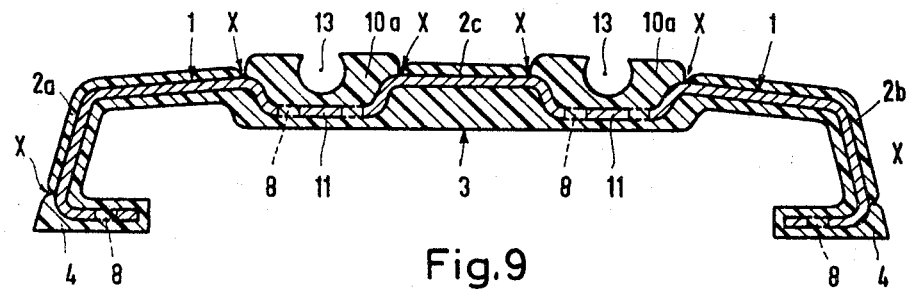
Figure 9:
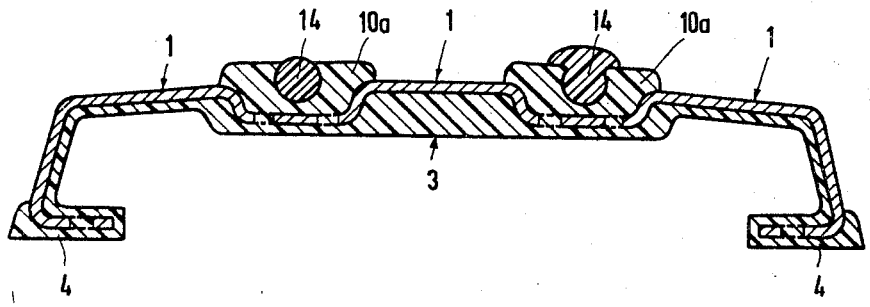

FIGS. 8 and 9, respectively, are cross-sectional views showing a decorative molding which is provided with a filler and additional expanding fillers, with a complete covering and after the removal of the covering from surface portions of the carrier.

FIG. 10 is an enlarged cross-sectional view showing a decorative molding according to the invention, which can be screw-fastened from the outside and comprises a snap-in covering strip and a complete covering.

FIG. 11 is a cross-sectional view similar to FIG. 11 and shows the molding when the covering has been removed in part and the covering strip has been snapped in.

FIG. 12 is a transverse sectional view showing a buffer strip, which is completely covered and has no filler.

FIG. 13 is a similar view showing the buffer strip of FIG. 12 with portions of the covering removed and after the application of a filler.

FIG. 14 is a transverse sectional view showing a footboard molding which is completely covered.

FIG. 15 is a similar transverse sectional view in which the covering is removed from parts of the carrier so that metallic decorative surfaces are exposed.

FIG. 16 is a transverse sectional view showing a shock-absorbing molding according to the invention in a fully covered condition.

FIG. 17 shows the molding of FIG. 16 after removal of parts of the covering.

Figure 18:
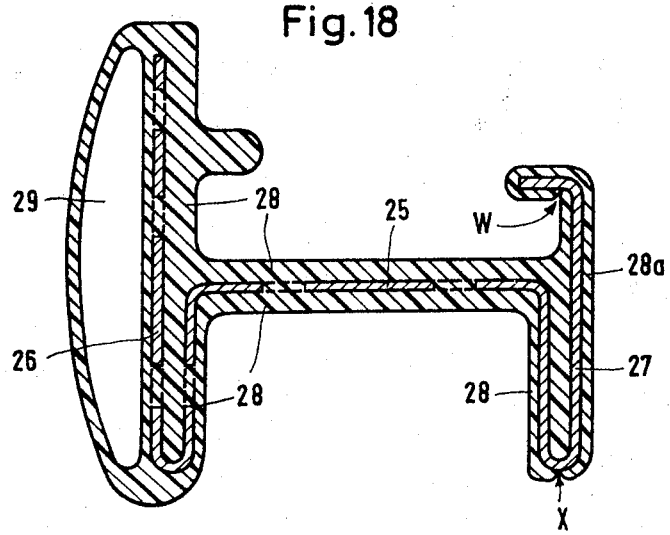

FIG. 18 is a transverse sectional view showing a window crossbar in a fully covered condition.

Figure 19:
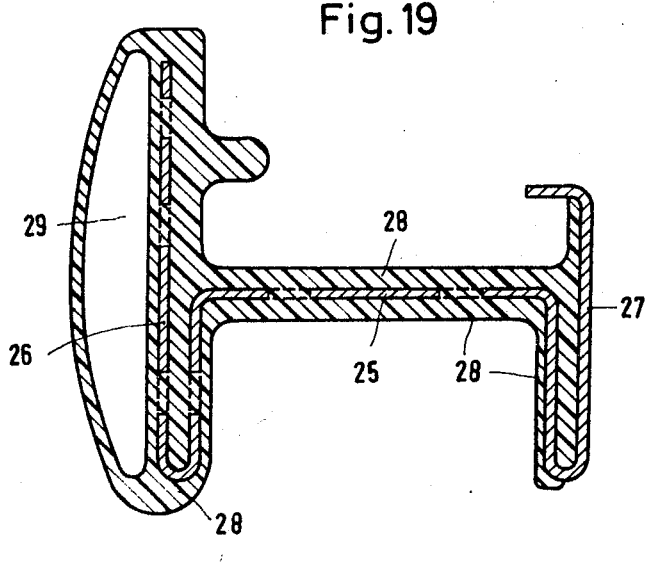

FIG. 19 shows the crossbar of FIG. 18, in which the covering has been removed from the outside limb of the carrier strip.

FIG. 20 is an enlarged view showing a window guide bar, which receives a glass pane.

FIG. 21 is a window well seal in contact with a glass pane.

In all embodiments and applications of the plastics-covered moldings shown in the drawings, the profiled carrying strip consists of corrosion-resisting material, preferably stainless steel. Such materials distinguish by a decorative appearance without need for an expensive surface finish.

The carrier strip 1 has a suitable, curved profile. Its shape is selected in accordance with the intended application. The carrier is completely covered with plastics material. This covering consists of the outer layer 2, the inner layer 3, the toe beads 4 and the enlarged portion 5. The latter is disposed on the end face. This covering of plastics material defines the contour of the molding and is formed in known manner by extruding the plastics material onto the carrier 1.

The covering 2 of the carrier 1 is provided with tear lines $w$, $x$, $y$, $z$, which extend in the longitudinal direction of the molding and enable a tearing of strip-shaped portions of the covering from predetermined areas of the carrier. A decorative effect will then be afforded by the exposed surface of the carrier strip, which consists of metal or the like and imparts stability and stiffness to the molding.

The tear lines $x$ consist preferably of indentations 6, 7 which are formed in the plastics material of the outer covering portion and define that plastics materials layer 2 or 2a, 2b which is to be removed.

In those areas in which the layer of plastic material is not to be removed, the carrier 1 is provided with perforations 8, which receive the plastics material in a plastic or flowable condition during the extrusion of said plastics material onto the carrier so that the outer layer 2 and the inner layer 3 are integrally joined together and the covering is firmly anchored in the carrier. In this way, the protuding buffers 9 are firmly connected in skirting strips as shown in FIGS. 1 to 3. The toe beads 4, which serve for sealing purposes, are similarly anchored.

The provision of a complete covering on the carrier strip facilitates and simplifies the extruding, and the covering affords protection when the moldings are being shipped and assembled. When the molding has been applied, the defined portions 2a, 2b of the covering are removed by tearing or stripping off the layer of plastics material between the indentations 6, 7. FIGS. 1 and 3 show an example of a completely covered molding. FIG. 2 shows a portion of the molding from which part of the covering has been stripped so that the metallic limbs 1a, 1b of the carrier 1 are exposed. These limbs may be profiled. The molding which has been described is secured to the carrying wall in known manner by screws, holding clips or the like fastening elements, which engage the molding from the rear.

To stiffen the carrier and to accommodate enlarged portions 9 or 10 of the covering, the carrier 1 is formed in its end face with inwardly curved portions 11, which are preferably provided at their bottom with perforations 10. Similar holes 8 are provided in the angled toe portions 4.

FIGS. 4 to 9 illustrate the application of the invention to a decorative molding to be secured from the rear. Removable covering portions 2a, 2b, 2c are provided on the limbs 1a, 1b and on a central strip 1c of the web. The enlarged portions 5 and 10 or 5a and 10a of the covering constitute so-called fillers so that the tear lines $x$ may be provided at favorable points of the molding, as shown, and the remaining covering has neatly closed edges (see FIG. 5).

As is apparent from FIGS. 6 and 7, a decorative molding described hereinbefore may be provided with overlays 12, which are heat-sealed to the enlarged portions 5a of the covering and differ in color from the visible toes in order to enhance the decorative effect.

In the embodiment shown in FIGS. 8 and 9, the thickened covering portion 10a constituting a filler is formed with a longitudinally extending, undercut recess 13 for receiving an expanding filler 14, which can be introduced into the recess 13 in the usual manner when the decorative molding has been secured to the mounting wall. This affords the advantages that the filler 10a will not be deformed or curved or corrugated, e.g., when it is subjected to a high temperature rise.

The embodiment shown in FIGS. 10–13 constitutes a decorative or buffer molding which can be screw-fastened from the outside. Such moldings are used, e.g., in the superstructures of busses. In this embodiment, the longitudinal groove 14 which receives the fasteners is to be closed by a filler 15 or 16. For this purpose, as shown in FIGS. 10 and 11, a strip 15 is provided, which is integrally extruded with the covering 2 of plastics material and merges into the same on one side, whereas the strip 15 can be snapped in on the other side. The removable portions 2a, 2b of the covering are disposed between the strip 15 and the toes 4. The strip 15 merges the anchored, enlarged portion 5b of the covering in the plane of the outer layers 2a, 2b of the covering. There is a recess 17, along which the strip 15 merges the enlarged portion 5b so that the strip 15 can well be bent into its snapped-in position. The strip 15 is integrally provided at its free end with a projection 18, which enters an undercut portion 19 to close the longitudinal groove 14, as is apparent from FIG. 11. In this embodiment, the side walls of the inwardly curved portion 11a are provided with perforations 8 so that the layers 2 and 3 of plastics material on both sides are joined together and anchored.

Holes 20 disposed at the longitudinal center line are provided at the bottom of the inwardly curved portion 11a. These holes are regularly spaced and form passages for the fastening screws, not shown, which can pierce the covering.

In the buffer molding shown in FIGS. 12 and 13, the inwardly curved portion 11b contains an enlarged portion 5c of the covering. This enlarged portion is formed on both sides with ribs 21, between which a separately made filler 16 may be snapped (see FIG. 13). In this embodiment, the tear lines $y$ are disposed at the ribs 21, the base of which is anchored in holes 8, which are close to the edge. To ensure in this embodiment a desirable flexibility of the toes 4a of the strip, e.g., also on curved surfaces, the limbs of the carrier 1 may be short on the outside and the tear line $x$ defining the removable covering portions 2a, 2b may be correspondingly disposed. To ensure a separation when the covering portions 2a, 2b are being torn off at the respective indentation $x$, the toes 4a are formed by the covering, which comprises a web 22 extending from the central portion to the edge.

A footboard molding embodying the invention is apparent from FIGS. 14 and 15. The carrier 1 is formed with a plurality of parallel, inwardly curved portions 11b, which are filled with the plastics material. The plastics material fillers 23 are anchored in suitable perforations and protrude in the form of ribs on the treadface. The outer covering layer 2 adjoints these ribs with tear lines $x$. A lip 24 may be provided in the plane of the molding and may be heat-sealed to a floor covering of plastics material. As is apparent from FIG. 15, the covering layers 2 between two indentations $x$ and $z$ are removed when the footboard molding has been mounted, as is shown in FIG. 15.

FIGS. 16 and 17 show a base molding, which has in its top part also an inwardly curved portion and is completely covered by layers 2 and 3 of plastics material in FIG. 16. To enable a removal of portions of the covering, two tear lines $x$ are provided. The removable portion 2d of the covering covers the inwardly curved portion 11b. At the lower end of the base molding, the covering is anchored in the carrier 1 by means of the holes 8. A heat-sealing edge 24 is formed at the lower end of the molding.

When the base molding has been mounted (see FIG. 17), the portion 2d of the plastics material covering is removed so that the molding exposes a decorative metallic surface, whereas the lower part of the molding remains covered and affords a certain protection against shock.

FIGS. 18 and 19 show a molding which forms a self-supporting window crossbar and is provided on the side facing the interior of the vehicle with a pad 29, which defines a hollow chamber and serves to prevent dangerous injuries due to impact in the case of an accident. The carrier is I-shaped and formed preferably by folding a metal strip. The web 25 and the flanges 26, 27 of the carrier are completely covered by plastics material forming a covering 28. The layer 28a of the covering is defined by the indentations x and w and can be torn off to expose the metallic flange 27.

It will be understood that the pad 29 which defines a hollow chamber is provided on that flange 26 which faces the interior of the vehicle.

FIG. 20 shows a channel-shaped molding, which constitutes a window-guiding bar 41. It contains a core in the form of a metal strip 42, which may be partly transversely slotted to increase its flexibility, as may be required. The metal strip 42 is entirely or partly embedded in flexible material, such as vulcanized rubber, non-vulcanized rubber composition, or gelled plastics material. The inside surfaces of the walls 49 and 410 of the channel are provided with pile fabric ribbons 411, 414, and 412, 415. The edge portion of a slidable glass pane 417 is slidingly guided and sealed by said ribbons. Another pile fabric ribbon 413, 416 is attached to the inside bottom surface of the window-guiding bar 41 and serves as a stop and seal for the edge of the glass pane 417. Instead of the pile fabric ribbon 413, 416, a ribbon may be used which consists of felt or of non-woven fibers and in which the fibers have been bulked by crimping or the like. If the depth of the channel 418 is to be increased in certain portions, the bottom 419 of the channel may be outwardly curved in the direction of the arrow V by a suitable tool within certain limits.

The flanges 43 and 44 of the metal strip 42 merge at the edge of the channel 418 into the outwardly reversely bent extensions 45 and 46, which have inwardly reversely bent free end portionse 47 and 48. The portions 420 and 421 of the covering on the extension 45 are reduced in thickness so that tear lines are formed, which extend in the longitudinal direction of the window-guiding bar 41. At the portions 420 and 421, the layer of yieldable material which covers the outside of the extension 45 can be severed by hand from the remaining covering of the bar. The covering layer has already been removed from the extension 46 of the metal strip 42 on the other flange side of the window-guiding bar 41. The exposed extension has both a structural function and a decorative effect.

The window-guiding bar 41 is fitted onto the offset flanges 426 and 427, which have free ends protruding into the channels 424 and 425. The offsetting portions of the flanges 426 and 427 are gripped between the lower edges of the reversely bent flange extensions 45 and 46 and the projections 422 and 423 so that the window-guiding bar is held firmly in position on the flanges 426 and 427 and cannot shift spontaneously in the direction in which it has been applied, nor in the opposite direction.

The window well seal 428 shown in FIG. 21 is similar in design to a single flange of the above-described window-guiding bar. The window well seal 428 comprises a metal strip 429, which is shaped in the form of a hook and is provided with a covering of yielding material, such as vulcanized rubber, non-vulcanized rubber composition or gelled plastics material. Just as with the window-guiding bar, the layer of yieldable material which covers the outside of the hook-shaped portion of the metal strip can be severed by tearing along the tear line from the remainder of the covering of the bar so that the metal strip 429 is exposed in this area.

The laterally bent portion 30 of the window well seal 428 embraces the edge of a flange 34. Spring clips 36 have previously been mounted on the flange covering 31 of the window well seal 428 and extend through holes 35 in the flange 34 and clamp the flange covering 31 in position against the flange 34. A pile fabric ribbon 32, 33 is secured to the inside of the window well seal 428 and in sealing contact with the glass pane 417.

What is claimed is:

1. A molding for motor-vehicle bodies, said molding comprising an elongate carrier, and a covering of plastic material on said carrier, said covering being formed with indentations extending longitudinally of said carrier defining severence lines in said covering for removal of covering portions between said indentations, said carrier being formed with perforations at certain locations, and the covering portions overlying said perforated locations extending therethrough to anchor said covering portions to the carrier.

2. A molding according to claim 1, said carrier being generally U-shaped in cross section, the covering portion on the bight region of said carrier being anchored thereto, and the covering portions on opposite sides of the anchored covering portion being removable.

3. A molding according to claim 2, said anchored portion being enlarged to provide a buffer and being formed with a longitudinally extending undercut recess for receiving a filler.

4. A molding according to claim 1, said carrier having a laterally medial longitudinally extending portion recessed for receiving the head of a fastener, and a strip portion integral with said covering and extending in openable closed relation over said recess.

5. A molding according to claim 4, said strip being separate from and snap-engaged with said covering.

6. A molding according to claim 5, said covering extending laterally between said recessed portion and the longitudinal edges of said carrier to define a pair of webs.

7. A molding according to claim 1, in combination with an edge strip extending longitudinally along one edge of said carrier integral therewith, and a covering of plastic material on said edge strip.

8. A molding according to claim 7, said integral edge strip having a reversely bent edge portion.

9. A molding according to claim 7, said carrier being generally U-shaped in cross section, and the edge portions of said edge strips being reversely bent.

References Cited

UNITED STATES PATENTS

| 2,628,144 | 2/1953 | Loetscher | 156—248 X |
| 3,138,834 | 6/1964 | Shanok | 52—716 X |
| 3,342,447 | 9/1967 | Marsh | 52—403 X |

FOREIGN PATENTS

| 377,143 | 1932 | Great Britain. |

OTHER REFERENCES

Modern Plastics, vol. 31, No. 1, pp. 98 and 99, September 1953.

JOHN E. MURTAGH, Primary Examiner.

U.S. Cl. X.R.

49—440; 52—173, 309, 717, 727, 731; 161—406